United States Patent [19]
Brown

[11] 3,743,061
[45] July 3, 1973

[54] AIR RELEASED FRICTION DEVICE
[76] Inventor: Robert J. Brown, 1100 Richman Knowl, Fullerton, Calif. 92532
[22] Filed: May 24, 1971
[21] Appl. No.: 146,416

Related U.S. Application Data
[62] Division of Ser. No. 838,747, July 3, 1969, abandoned.

[52] U.S. Cl. .......................... 188/170, 188/264 AA
[51] Int. Cl. ....................... F16d 65/24, F16d 65/78
[58] Field of Search......... 188/170, 264 A, 264 AA; 192/91 A

[56] References Cited
UNITED STATES PATENTS
3,297,115  1/1967  Waloen.............................. 188/170

FOREIGN PATENTS OR APPLICATIONS
1,000,969  8/1965  Great Britain.................... 192/91 A Primary Examiner—Edward A. Sroka
Attorney—Newton H. Lee, Jr.

[57] ABSTRACT

A friction brake including a rotary disc and a stationary brake unit having a body located adjacent to the periphery of the disc and straddling the periphery of the disc. The body has opposed piston chambers and brake pads spring loaded into engagement with the disc. Air is admitted through the pads between the opposing faces of the pad and the disc to free the disc for rotation.

4 Claims, 2 Drawing Figures

PATENTED JUL 3 1973

3,743,061

INVENTOR
Robert J. Brown
BY
Newton H. Lee, Jr.

AIR RELEASED FRICTION DEVICE

CROSS-REFERENCE TO RELATED APPLICATION

This application is a division of my pending application, Ser. No. 838,747, filed July 3, 1969 now abandoned.

BACKGROUND OF THE INVENTION

Heretofore it has been customary with friction devices for transmitting torque, that is, friction brakes, to employ a pressure medium, either hydraulic fluid or air, to effect coengagement of the relatively rotatable friction members. In some cases, the friction device may be spring loaded into engagement and pressure released.

In many fields, where air is employed to control or operate machinery, there has been a need for quick acting, effective brakes of simple construction and which are easy to manufacture, operate, and maintain. Particularly, lag time between the application of air pressure to engage a brake and effective frictional coengagement of the friction members has posed a problem.

SUMMARY OF THE INVENTION

The present invention provides a friction device or brake, which is pneumatically operated, in the sense that air pressure is employed to release the brake, and which is spring loaded to engaged condition, the structure being such that application of the brake is substantially instantaneous upon interruption of the flow of air to the device.

More particularly, the present invention provides a brake, wherein a friction member has face-to-face coengagement with an opposed friction member, and wherein a film of air flowing between the opposing faces is employed to prevent frictional coengagement of the faces, the members being biased one towards the other so that immediately, upon interruption of the flow of air between the faces, the members are effectively coengaged.

With such a friction brake construction, a small volume of air leakage between the opposing faces may provide a large force tending to separate the friction faces, whereby to overcome a substantial counter force of a spring or springs tending to cause frictional coengagement of the friction faces. Moreover, the air film flowing between the faces prevents wear and effects cooling of the surfaces during repeated intermittent applications.

Among the objects of the invention is the provision of a simple, rugged, and durable friction device in the form of a brake, which is easy to manufacture and maintain.

This invention possesses many other advantages, and has other purposes which may be made more clearly apparent from a consideration of forms in which it may be embodied. These forms are shown in the drawings accompanying and forming part of the present specification. They will now be described in detail, for the purpose of illustrating the general principles of the invention; but it is to be understood that such detailed descriptions are not to be taken in a limiting sense, since the scope of the invention is best defined by the appended claims.

DESCRIPTION OF THE PREFERRED EMBODIMENT

Figure 1:
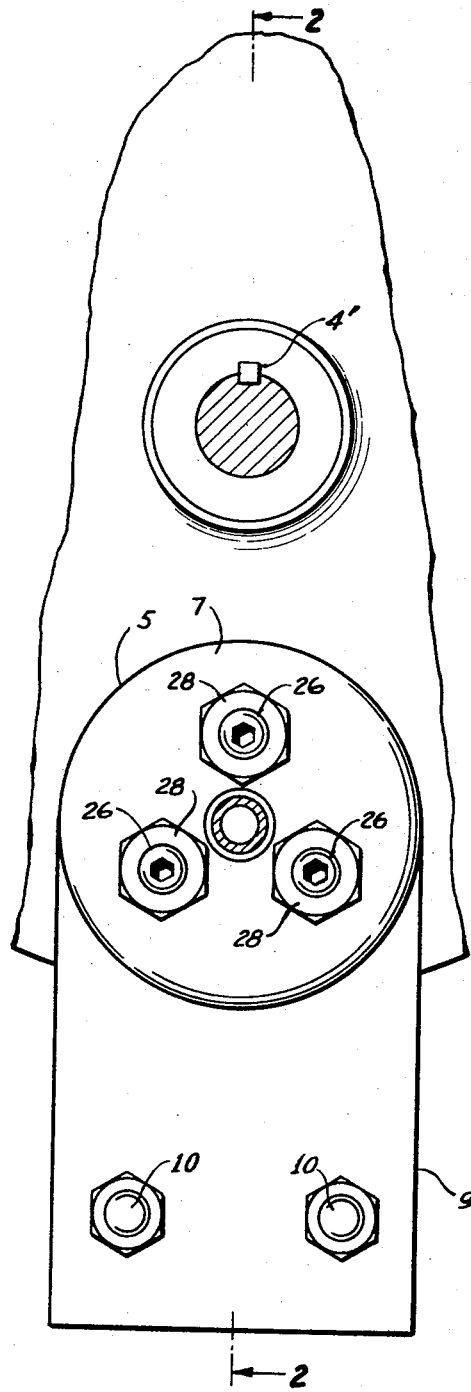
FIG. 1 is a view in side elevation of a friction brake embodying the invention, a portion of the rotary disc being broken away.
Figure 2:
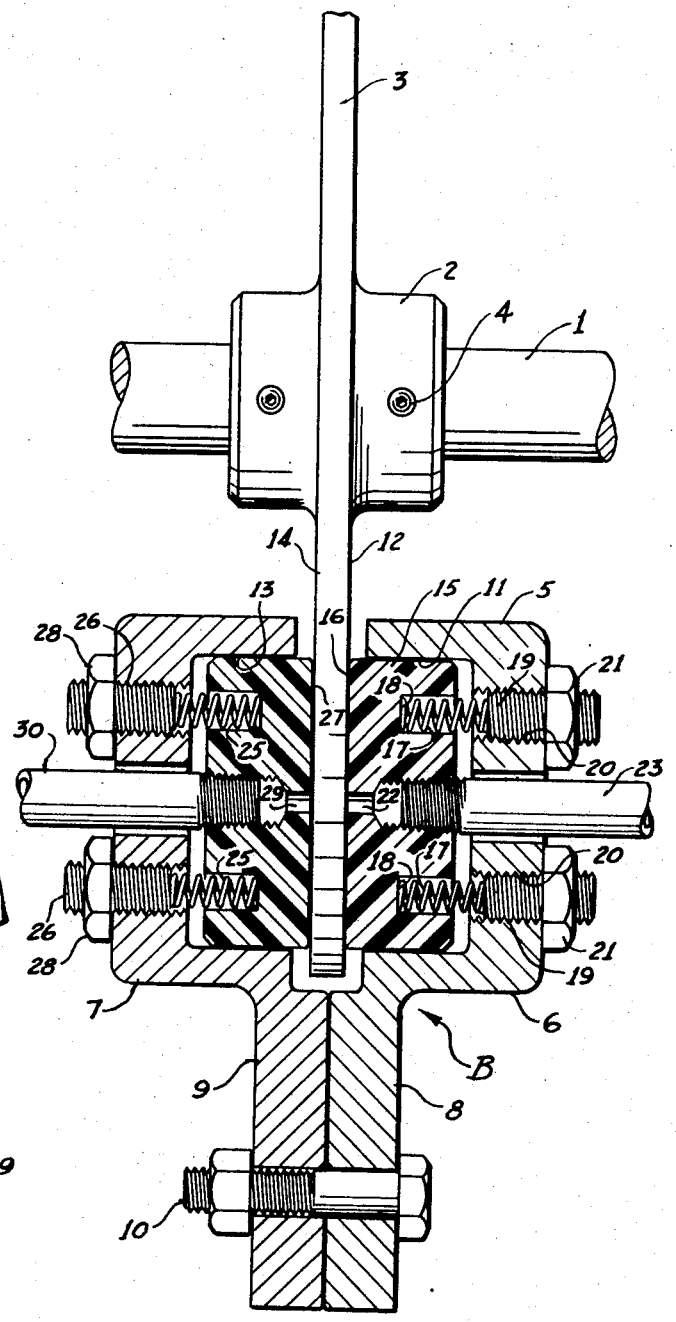
FIG. 2 is a view partly in vertical section as taken on the line 2—2 of FIG. 1, the rotary disc being shown in elevation.

Referring to the brake assembly as shown in the drawing, it will be seen that this assembly comprises a shaft 1 on which is mounted the hub 2 of a brake disc 3. The hub 2 is affixed as by set screws 4 against axial displacement with respect to the shaft 1 and a key 4' keys the hub 2 to the shaft 1 for rotation thereof as a unit, so that a braking effort applied to the disc 3 will correspondingly brake the shaft 1.

The brake assembly, generally denoted at B, includes a support 5 comprising a pair of body sections 6 and 7 having outstanding flanges 8 and 9 suitably joined together as by fasteners 10, 10. These flanges provide means adapted to be connected to an appropriate stationary support (not shown), as by means of the fasteners 10 or otherwise.

The body parts 6 and 7 straddle the periphery of the disc 3. Body part 6 is provided with a chamber 11 of cylindrical form opening towards a side face 12 of the disc 3. Correspondingly, the body part 7 has a cylindrical chamber 13 opening towards the opposing side face 14 of the disc 3. Reciprocally disposed in the chamber 11 of the body part 6 is a cylindrical friction pad or member 15 composed of suitable material having the desired coefficient of friction with the disc 3. As an example, the pad 15 may be composed micarta. This friction pad 15 has a flat end face 16 engageable with the flat side face 12 of the disc 3. Means are provided for forcing the pad 15 against the disc 3 and into frictional coengagement therewith, whereby torque from the disc 3 is transmitted to the pad 15 and thence to the supporting body 5, and illustratively, a suitable number of coiled compression springs 17 are provided within the body part 6. At one end, the springs 17 respectively engage in a seat 18. At the other end, the springs 17 engage adjustable spring seats 19 in the form of screws threaded in bores 20 in the body part 6. The screw seats 19 may be axially adjusted to vary the compressive force of the springs 17 acting to effect engagement of the brake. Lock nuts 21 are engaged with the screws 19 to lock them in selected adjusted positions. Any suitable number of springs 17 may be employed, such as three springs spaced equally about the axis of the pad 15.

Air inlet means including a port 22 coaxially of the pad 15 are provided for conducting air into the assembly. A suitable air conduit 23 is connected to the pad 15 to supply air to the port 22, such air escaping as a film between the flat face 16 of the pad 15 and the opposing flat face 12 of the disc 3. Such film of air is adapted to effectively cause disengagement of the brake by forcing the pad 15 axially against the bias of the springs 17.

It will be appreciated that low air pressure acting between the faces 16 and 12 may be productive of a substantial force for disengaging the brake, since the disc or pad 15 affords substantial annular area responsive to the air pressure. Moreover, the film pressure may be maintained with low air volume such as is readily available in machinery of the air operated or regulated type, to which the present brake is particularly applicable.

In the embodiment of the brake herein shown, a second pad or friction member 24 is disposed in the chamber 13 of the body section 7 of the support 5 in opposed relation to the pad 15, whereby the pads 15 and 24 are adapted to clamp the disc 3 therebetween.

Thus, springs 25 under compression, depending upon the adjustment of the spring adjuster screws 26, are adapted to force the flat face 27 of the pad 24 into frictional engagement with the flat face 14 of the disc 3. In addition, lock nuts 28 are provided on the adjuster screws 26.

The pad 24 has a port 29 centrally thereof and adapted to receive air from a conduit 30, whereby air under pressure may be supplied between the disc 3 and the pad 24 to effect disengagement of the pad 24 from the flat disc face 14.

It will now be apparent that the present invention provides an air released brake which is released by the escape of a small volume of air between the flat friction surfaces, the device engaging instantaneously when the air flow is interrupted.

I claim:

1. A brake device comprising: a rotatable disc, a stationary support located adjacent to the periphery of said disc at one side only of the axis of rotation of said disc and including body parts straddling the periphery of said disc, said body parts having opposed cylindrical chambers opening towards opposite sides of said disc, a cylindrical friction pad in each of said chambers, air inlet means leading into said chambers and connected to said pads, said pads having passages therein opening between said pads and said disc, whereby air may be supplied to said inlet means and flow between said pads and the opposing faces of said disc to release the brake device, and spring means for biasing said pads into engagement with said disc to engage the brake device.

2. A brake device as defined in claim 1, wherein said air inlet means is connected to said pads at the center thereof, and said passages extend centrally of said pads.

3. A brake device as defined in claim 1, wherein said spring means includes a plurality of coiled compression springs spaced about the axis of said pads, said pads having seats for an end of said springs, and said support having seats for the other end of said springs, said latter seats being adjustable towards and away from the first-mentioned seats to vary the force of said springs.

4. A brake device as defined in claim 1, wherein said body parts include flange portions separably interconnected together and supporting said body parts.

* * * * *